United States Patent
Naeimi et al.

(10) Patent No.: US 10,423,540 B2
(45) Date of Patent: Sep. 24, 2019

(54) APPARATUS, SYSTEM, AND METHOD TO DETERMINE A CACHE LINE IN A FIRST MEMORY DEVICE TO BE EVICTED FOR AN INCOMING CACHE LINE FROM A SECOND MEMORY DEVICE

(71) Applicant: INTEL CORPORATION, Santa Clara, CA (US)

(72) Inventors: Helia Naeimi, Santa Clara, CA (US); Qi Zeng, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 120 days.

(21) Appl. No.: 15/717,933

(22) Filed: Sep. 27, 2017

(65) Prior Publication Data
US 2019/0095349 A1 Mar. 28, 2019

(51) Int. Cl.
*G06F 12/00* (2006.01)
*G06F 13/00* (2006.01)
*G06F 13/28* (2006.01)
*G06F 12/128* (2016.01)
*G06F 12/0891* (2016.01)
*G06F 12/0831* (2016.01)
*G06F 12/0811* (2016.01)
*G06F 12/123* (2016.01)
*G06F 12/121* (2016.01)

(52) U.S. Cl.
CPC ........ *G06F 12/128* (2013.01); *G06F 12/0811* (2013.01); *G06F 12/0831* (2013.01); *G06F 12/0891* (2013.01); *G06F 12/121* (2013.01); *G06F 12/123* (2013.01); *G06F 2212/283* (2013.01); *G06F 2212/621* (2013.01)

(58) Field of Classification Search
CPC ..... G06F 12/123; G06F 12/128; G06F 12/121
USPC ........................................................ 711/135
See application file for complete search history.

(56) References Cited

PUBLICATIONS

Chi, P., et al., "Architecture Design with STT-RAM: Opportunities and Challenges", © 2016 IEEE, 6 pp.
Khan, S., et al., "Improving Cache Performance by Exploiting Read-Write Disparity", Feb. 2014, 12 pp.
Kultursay, E., et al., "Evaluating STT-RAM as an Energy-Efficient Main Memory Alternative", Apr. 2013, 12 pp.
Lempel, O., "2nd Generation Intel Core Processor Family: Intel Core i7, i5 and i3", Aug. 2011, 48 pp.
Wikipedia, "CPU Cache", [online] last edited Jun. 18, 2017, [retrieved on Jul. 17, 2017], Retrieved from the Internet at <URL: https:en.wikipedia.org/wiki/CPU_cache>, 13 pp.

(Continued)

*Primary Examiner* — Edward J Dudek, Jr.
*Assistant Examiner* — Sidney Li
(74) *Attorney, Agent, or Firm* — Konrad Raynes Davda & Victor LLP; David W. Victor

(57) ABSTRACT

Provided are an apparatus, system, and method to determine a cache line in a first memory device to be evicted for an incoming cache line in a second memory device. An incoming cache line is read from the second memory device. A plurality of cache lines in the first memory device are processed to determine an eviction cache line of the plurality of cache lines in the first memory device having a least number of bits that differ from corresponding bits in the incoming cache line. Bits from the incoming cache line that are different from the bits in the eviction cache line are written to the eviction cache line in the first memory device.

25 Claims, 5 Drawing Sheets

(56) References Cited

PUBLICATIONS

Wikipedia, "Memory Management Unit", [online] last edited Jun. 8, 2017, [retrieved on Jul. 17, 2017], Retrieved from the Internet at <URL: https://en.wikipedia.org/wiki/Memory_management_unit>, 5 pp.

United States Patent Application, entitled "Apparatus, System, Integrated Circuit Die, and Method to Determine When to Bypass a Second Level Cache When Evicting Modified Data From a First Level Cache", filed Sep. 27, 2017, 24 pp. [77.401 (Appln)].

Notice of Allowance for U.S. Appl. No. 15/717,934, dated Jun. 28, 2019, 16 pp. [77.402 (NOA1)].

APPARATUS, SYSTEM, AND METHOD TO DETERMINE A CACHE LINE IN A FIRST MEMORY DEVICE TO BE EVICTED FOR AN INCOMING CACHE LINE FROM A SECOND MEMORY DEVICE

TECHNICAL FIELD

Embodiments described herein generally relate to a non-volatile memory device.

BACKGROUND

In hierarchical cache management system, only a subset of data in the higher level caches (caches further away from the processor) are available in the lower level caches (caches closer to the processor). Every time a new cache line is being copied over from a higher level cache to a lower level cache, an existing cache line in the lower level cache needs to be replaced with the new cache line. In a set associative cache structure, there are multiple choices for the cache line to be evicted, for every incoming cache line. How the eviction address is selected is called the replacement policy.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
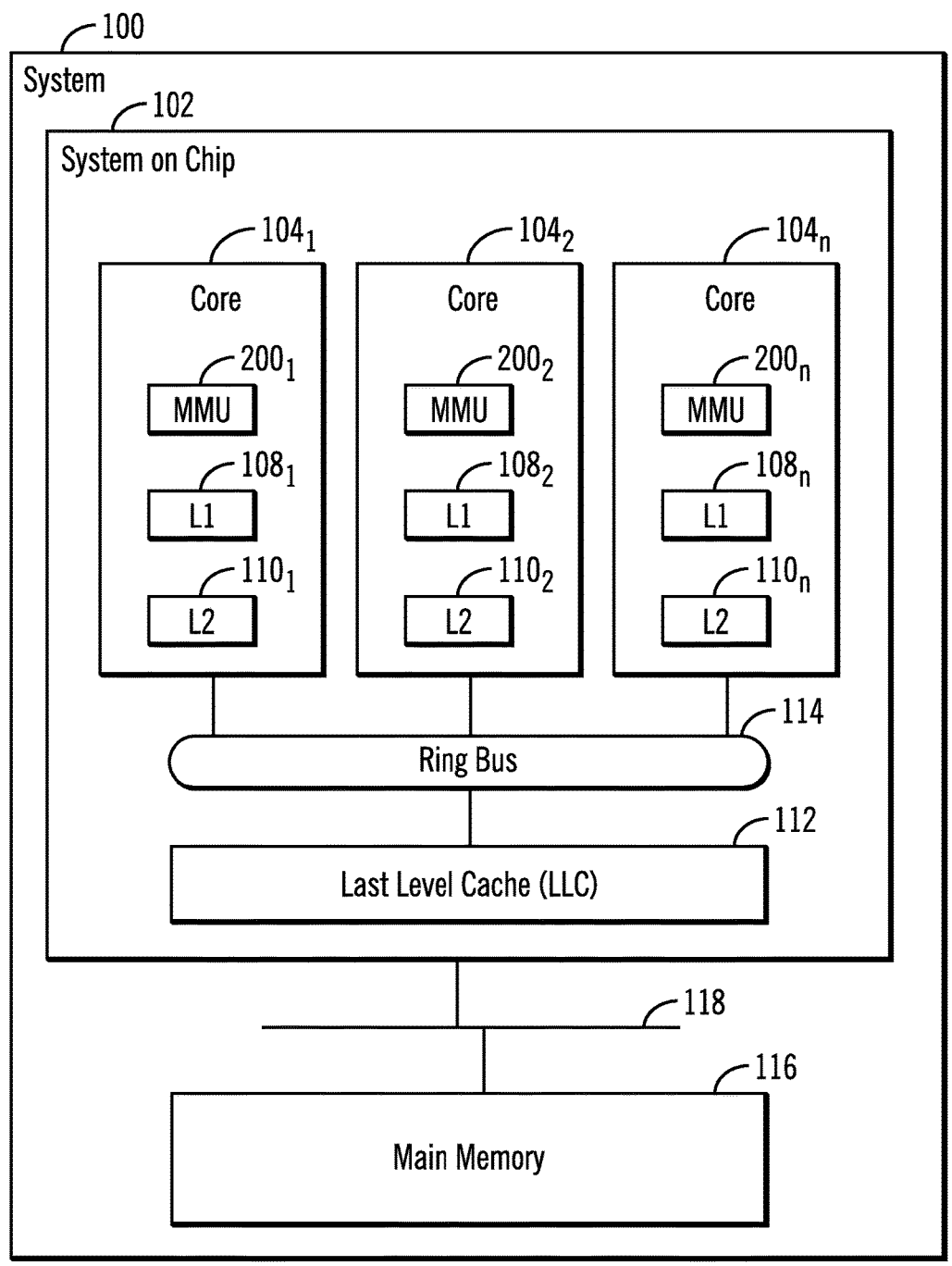
FIG. 1 illustrates distributions of a system in which embodiments are implemented.

Certain types of memory devices, such as a Spin Torque Transfer-Random Access Memory (STT-RAM) memory device, consume significant amounts of energy for writes and experience write latency. However, such memory devices may have advantages of low power consumption and low latency for reads and may be suitable for being deployed as an intermediary cache, such as a last level cache, between on-chip caches (e.g., L1 and L2) on the processor cores and the main memory.

Described embodiments provide techniques to improve endurance of a memory storage device by limiting writes to a memory device that consumes significant amounts of energy for writes relative to the energy consumption for reads. With described embodiments, when an incoming cache line from a second memory device, such as a main memory, is going to be added to a first memory device, such as a last level cache (LLC) between the main memory and a higher level memory, a cache line in the first memory device, e.g., LLC, may have to be evicted and replaced with the incoming cache line. A plurality of the cache lines in the LLC are processed to determine a cache line having the least number of bits that differ from corresponding bits in the incoming cache line from the second memory device, e.g., main memory. The determined cache line is selected as the eviction cache line to evict from the first memory device and a partial write operation may then be performed to only write bits at the location of the eviction cache line in the LLC that differ from the corresponding bits in the incoming cache line. An eviction cache line comprises a cache line selected to evict to replace with an incoming cache line.

In certain embodiments where the first memory device (LLC) utilizes a set associative cache structure, the cache lines are ordered based on how recently they are used. This is done by maintaining a Least Recently Used (LRU) table for each set. The evicted address is selected among the least recently used subset of cache lines in the set of cache lines to which the incoming cache line maps. A partial write operation may then be performed to only write bits at the location of the eviction cache line in the LLC that differ from the corresponding bits in the incoming cache line.

Described embodiments are an improvement over just selecting the least recently used entry for eviction to make room for an incoming cache line by considering a number of least recently used cache lines from the LRU and bitwise compare them with the incoming cache line to further reduce the number of writes that need to be performed when writing a new cache line to LLC Described embodiments provide improvements to the computer technology of performing writes to a memory device where writes consume significantly more energy as compared to reads, such as with STT-RAM devices, by selecting the cache line in the memory device (LLC) to replace to minimize the number of writes that need to be performed, which reduces the number of bit level switching to perform a write. Further, described embodiments, minimize the effect on the memory (e.g., LLC) cache hit rate by selecting a cache line to evict that is among the top of the least recently used (LRU) entries of the corresponding set in the memory device, because cache access demand is less likely to occur for those cache lines that are less recently used than those cache lines that are more recently used.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a system 100 including a system-on-a-chip 102 having a plurality of processing cores $104_1, 104_2 \ldots 104_n$, each having a memory management unit (MMU) $200_1, 200_2 \ldots 200_n$, an on-chip L1 cache $108_1, 108_2 \ldots 108_n$ and on-chip L2 cache $110_1, 110_2 \ldots 110_n$ that are private to the processing cores $104_1, 104_2 \ldots 104_n$. A main memory 116 provides storage of data for the system-on-chip 102, such as a system memory. The processing cores $104_1, 104_2 \ldots 104_n$ may write back modified cache lines from the L2 cache $110_1, 110_2 \ldots 110_n$ to a shared last level cache (LLC) 112 to make room for a cache line evicted from the L1 cache $108_1, 108_2 \ldots 108_n$. When modified data needs to be removed from the L2 cache $110_1, 110_2 \ldots 110_n$ to make room for modified data from the L1 cache $108_1, 108_2 \ldots 108_n$ a write back operation is performed to write the data to the last level cache 112 over a ring bus 114. When modified data needs to be removed from the last level cache 112 to make room for new modified data from the L2 cache $110_1, 110_2 \ldots 110_n$, it is written to the main memory 116 over a bus 118, such as a memory bus or Peripheral Component Interconnect Express (PCIe) bus. In this way the L1 cache $108_1, 108_2 \ldots 108_n$ and L2 cache $110_1, 110_2 \ldots 110_n$, last level cache 112, and main memory 116 provide a hierarchy of caches.

Further, data may be moved from the main memory 116 to the last level cache 112 to provide intermediate storage before the data is sent to the L2 cache $110_1, 110_2 \ldots 110_n$. In such case, the memory management unit $200_1, 200_2 \ldots 200_n$ may need to select a cache line in the last level cache 112 for data being transferred from the main memory 116.

The processing cores $104_1, 104_2 \ldots 104_n$ may each include additional components such as a system agent, bus interface controllers, graphics, translation lookaside buffer (TLB), etc. Further, there may only be one cache on a processing core $104_i$, where a processing core $104_i$ comprises any one of the processing cores $104_1, 104_2 \ldots 104_n$.

The memory management units $200_1, 200_2 \ldots 200_n$ may be implemented in the integrated circuit die forming the processing core $104_1, 104_2 \ldots 104_n$. Alternatively, the memory management unit may be implemented in an Application Specific Integrated Circuit (ASIC) separate from the cores $104_1, 104_2 \ldots 104_n$. Still further, the memory management units may be implemented as software in a computer storage medium that is loaded from memory and executed by the processing cores $104_1, 104_2 \ldots 104_n$.

In FIG. 1, the last level cache 112 is shown in the system-on-a-chip 102. In alternative embodiments, the last level cache 112 may be on the system 100 motherboard external to the system-on-a-chip 112.

The L1 cache $108_1, 108_2 \ldots 108_n$ and L2 cache $110_1, 110_2 \ldots 110_n$ may be small and private to each processing core $104_1, 104_2 \ldots 104_n$, such as on the chip of the processing core $104_1$. The last level cache 112 may have more capacity than the L1 and L2 caches. The last level cache 112 may be organized as an associative cache, where each memory address would map to a set of address in the last level cache 112. When all the lines in a set are used in the last level cache 112, then the memory management unit $200_i$ of a processing core $104_i$ needing to move the data from its L2 cache $110_i$ uses a replacement policy to decide on the cache line in the set to evict to make room for modified data from the L2 cache $110_i$. L2 cache $110_1$ comprises any one of the L2 cache $110_1, 110_2 \ldots 110_n$. In certain embodiments, the last level cache 112 may be divided into slices, one slice for each processing core $104_1, 104_2 \ldots 104_n$, where each slice stores data for a specific core.

Further, in certain embodiments, the main memory 116 provides a larger address space than the last level cache 112, and the last level cache 112 may provide a set associative cache for the main memory 116, such that each memory address in the main memory 116 maps to a set of memory addresses in the last level cache 112.

In one embodiment, the L1 cache $108_1, 108_2 \ldots 108_n$ and L2 cache $110_1, 110_2 \ldots 110_n$ are implemented on the processing cores $104_1, 104_2 \ldots 104_n$. The last level cache (LLC) may comprise a non-volatile memory device, such as a spin-transfer torque magnetic random-access memory (STT-RAM), which has the characteristic of high read performance and low read energy consumption, but has a higher write energy and longer write latency. The main memory 116 may comprise the main system memory, such as comprised of Dynamic Random Access Memory (DRAM), etc. Other non-volatile memory devices may be used for the last level cache 112 and main memory 116 including, but not limited to, a three dimensional crosspoint (3D crosspoint) memory device, or other byte addressable write-in-place nonvolatile memory devices. In some embodiments, 3D crosspoint memory may comprise a transistor-less stackable cross point architecture in which memory cells sit at the intersection of word lines and bit lines and are individually addressable and in which bit storage is based on a change in bulk resistance.

The memory devices 112 and 116 may also include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory, or storage, such as magnetic storage medium, etc. hard disk drives, tape, etc. The memory device may refer to the die itself and/or to a packaged memory product.

FIG. 1 shows a multi-core implementation. In an alternative embodiment, the last level cache 112 may be provided for just a single core processor having an L1 and L2 cache. The number of cores may comprise any number of one or more cores implemented on the system-on-a-chip 102. The system-on-a-chip 102 may comprise an Intel® Core® microarchitecture or multi-core processor microarchitecture from other vendors and manufacturers. (Intel and Core are trademarks of Intel Corporation throughout the world).

FIG. 1 shows a hierarchical cache system where a highest level cache, or first level cache, comprises an on-chip cache, such as an L2 cache, where a second level cache, or intermediary cache, comprises a last level cache 112, and where a third or lowest level cache comprises a main memory 116. In a further embodiment, the first level cache may comprise the L1 cache $108_1, 108_2 \ldots 108_n$ and the second level cache may comprise the L2 cache $110_1, 110_2 \ldots 110_n$. In alternative embodiments, the first, second, and third level caches in a cache hierarchy may be implemented in systems different than shown in FIG. 1 and comprise different types of cache devices than shown in FIG. 1.

In described embodiments, the third level cache 116 has a largest number of cache lines or addresses and multiple addresses in the third level cache map to one cache line in the first and second level caches. Further, multiple addresses or cache lines in the third level cache may map to a smaller number of a set of cache lines than in the second level cache. In this way, there may be cache conflicts, because data for a cache line or cache line in the second level cache may have to be evicted to make room for data for an address in the third level cache.

Figure 2:
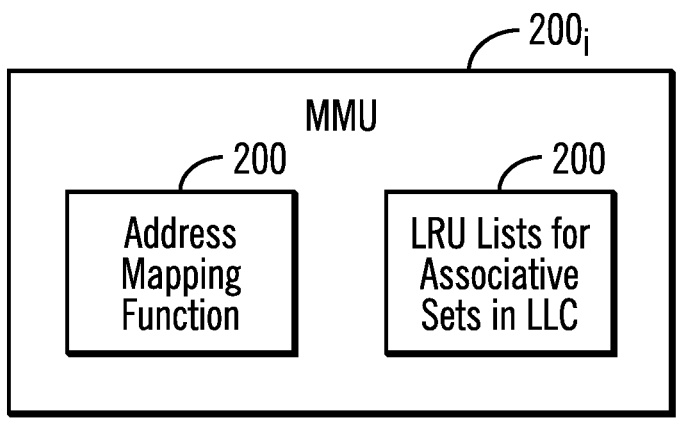
FIG. 2 illustrates an embodiment of information maintained by a memory management unit.

FIG. 2 illustrates an embodiment of information maintained by the memory management unit $200_i$, such as one of the memory management units $200_1$, $200_2$ ... $200_n$ shown in FIG. 1, including an address mapping function 202 to map an address in the main memory 116 to a cache line in the last level cache 112, and Least Recently Used (LRU) lists 300 for the different set associative cache regions of the last level cache 112. The address mapping function 202 may comprise circuitry, logic, etc. in the core $104_i$ and the LRU lists 300 may be implemented in buffer circuitry of the core $104_i$. The memory management units $200_1$, $200_2$ ... $200_n$ may include Input/Output circuitry and hardware logic to perform the replacement and eviction related operations of FIG. 4, including a bitwise comparison of an incoming cache line from the main memory 116 and cache lines in the last level cache 112, such as described XOR operations.

In one embodiment, the last level cache 112 may be organized as an associative-set cache, where the address mapping function 202 maps each memory address from the main memory 116 to a set of address in the last level cache 112, such that the data for the address in the main memory 116 may be stored in any cache line in the set of cache lines in the second level cache 112 to which the address maps. When the main memory 116 has a larger address space than the last level cache 112, more addresses in the main memory 116 would map to a set of addresses than the number of cache lines in the set. Segments of bits from the main memory address, such as set bits, may be used to determine the associative set of addresses to which the main memory 116 address maps.

When all the cache lines in a set are used in the last level cache 112, then the memory management unit $200_i$ uses a replacement policy to select the cache line in the set to evict to make room for data from the main memory 116. The memory management unit $200_i$ for one of the processing cores $104_i$ may stage modified or unmodified data from the main memory 116 to the last level cache 112 to make available for the processor core $104_i$. In certain embodiments, the last level cache 112 may be divided into slices, one slice for each processing core $104_1$, $104_2$ ... $104_n$, where each slice stores data for a specific core.

The memory management unit $200_i$ may maintain a different LRU list 300 for each associative set of address in the last level cache 112 to allow for selection of a least recently used (LRU) cache lines within a set for eviction to make room for data being added from the main memory 116.

Figure 3:
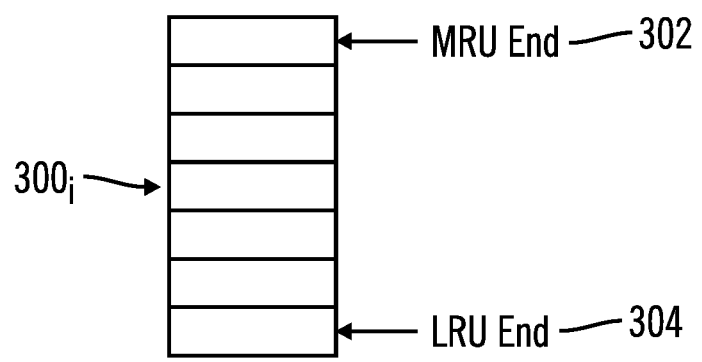
FIG. 3 illustrates an embodiment of a Least Recently Used (LRU) list.

FIG. 3 illustrates an embodiment of an LRU list $300_i$ for a set of addresses/cache lines in the last level cache 112, having a most recently used (MRU) end 302 identifying a cache line at an address having data most recently added or accessed in the set in the last level cache 112 and a least recently used (LRU) end 304 having data for an address in the set least used or accessed.

Figure 4:
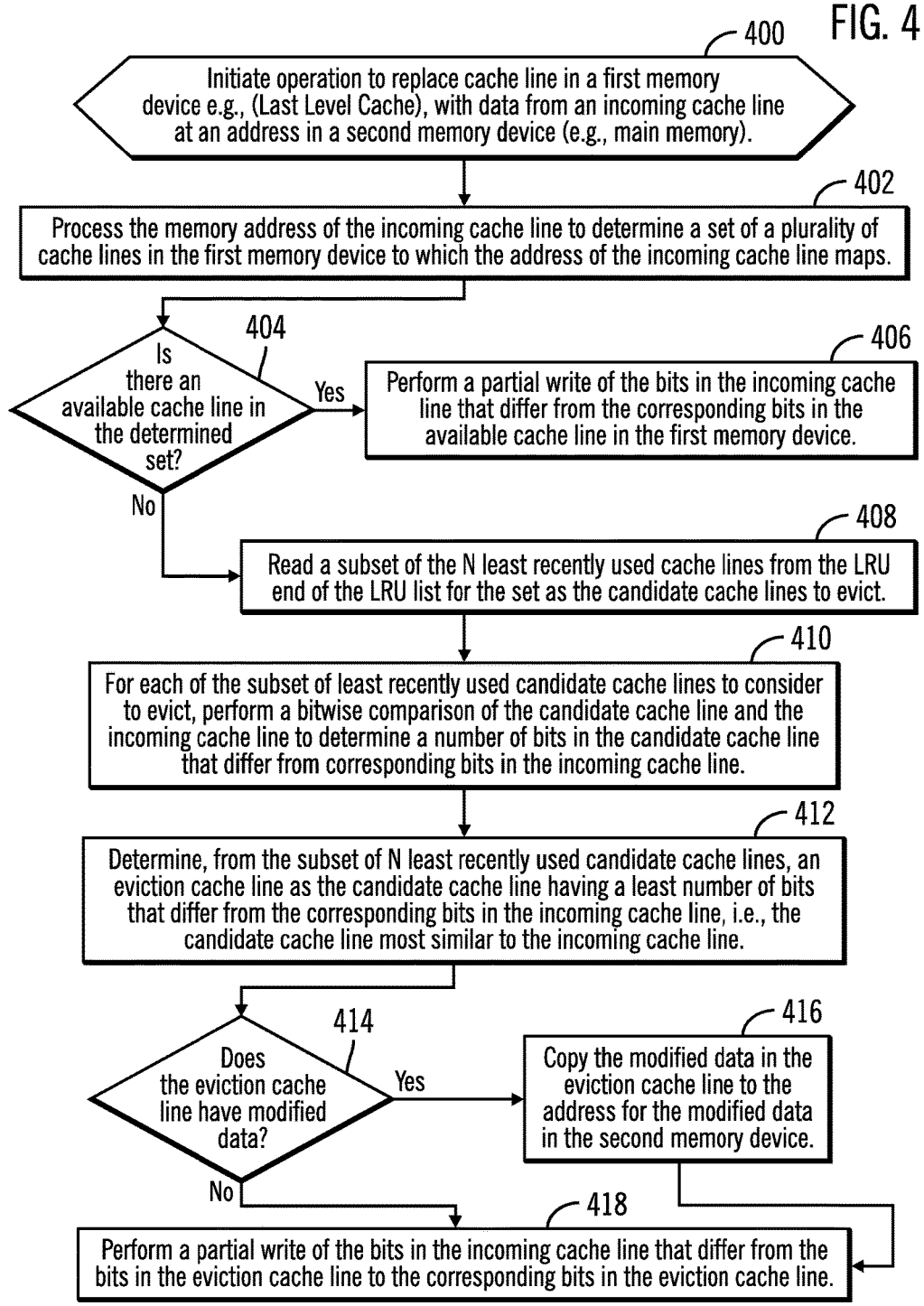
FIG. 4 illustrates an embodiment of operations to select a cache line in a memory device to write data at an address in another memory device.

FIG. 4 illustrates an embodiment of operations performed by a memory management unit $200_i$ in a core $104_1$ to replace a cache line in a first memory device, such as a last level cache $112_1$ with data at an address in a second memory device, such as the main memory 116. The memory management unit $200_i$ may stage data for an address in the main memory 116 to the last level cache 112 to be available to provide to one of the processor core $104_i$ caches $108i$, $110_i$. L1 cache $108_i$ comprises any one of L1 caches $108_1$, $108_2$ ... $108_n$. In certain embodiments, the second memory device 116 has a larger address space than the first memory device 112, and each address in the second memory device 116 maps to a set of addresses in the first memory device 112, such that there are more addresses in the second memory device 116 mapping to a particular set than the number of cache lines (or cache lines) in the set in the first memory device 112. Upon initiating (at block 400) the operation to replace a cache line in the first memory device (e.g., LLC 112), with an incoming cache line from the second memory device (e.g., main memory 116), the address mapping function 202 of the memory management unit $200_i$ processes (at block 402) the memory address of the incoming cache line to determine a set of a plurality of cache lines in the first memory device 112 to which the memory address maps, such as in a set associative cache. If (at block 404) there is an available cache line in the determined set, then the memory management unit $200_i$ performs (at block 406) a partial write of the bits in the address in the second memory device that differ from the corresponding bits in the available cache line in the first memory device, and writes those different bits to the available cache line.

If (at block 404) there is no available cache line in the determined set of the first memory device 112, then the memory management unit $200_i$ determines (at block 408) from the LRU list $300_i$ for the determined set, a subset of N least recently used cache lines from the LRU end 304 of the LRU list $300_i$ as candidate cache lines to replace, where N is a number less than the total number of cache lines in a set. For each of the subset of candidate cache lines, the memory management unit $200_i$ performs (at block 410) a bitwise comparison between each of the N least recently used cache lines and the incoming cache line to determine a number of bits in the candidate cache line that differ from corresponding bits in the incoming cache line for each of the N recently used cache lines. From the subset of N least recently used candidate cache lines, a determination is made (at block 412) of an eviction cache line that comprises the candidate cache line having a least number of bits that differ from the corresponding bits in the incoming cache line, i.e., the candidate cache line most similar to the incoming cache line. In this way, the memory management unit $200_i$ determines the eviction cache line to evict from the N least recently used or accessed lines whose bits differ the least from the bits in the incoming cache line, or the candidate cache line that is most similar to the incoming cache line.

If (at block 414) the eviction cache line has modified data for an address, then the memory management unit $200_i$ copies (at block 416) the modified data in the eviction cache line is copied to the second memory device 116, so the modified data is moved off before being overwritten by the data for the incoming cache line. If (at block 414) the eviction cache line does not have modified data or after the modified data is copied off to the second memory device 116 (at block 416), then the memory management unit $200_i$ performs or causes to be performed (at block 418) a partial write of the bits in the incoming cache line that differ from the bits in the eviction cache line (having the least number of different bits) to the corresponding bits in the eviction cache line.

Figure 5:
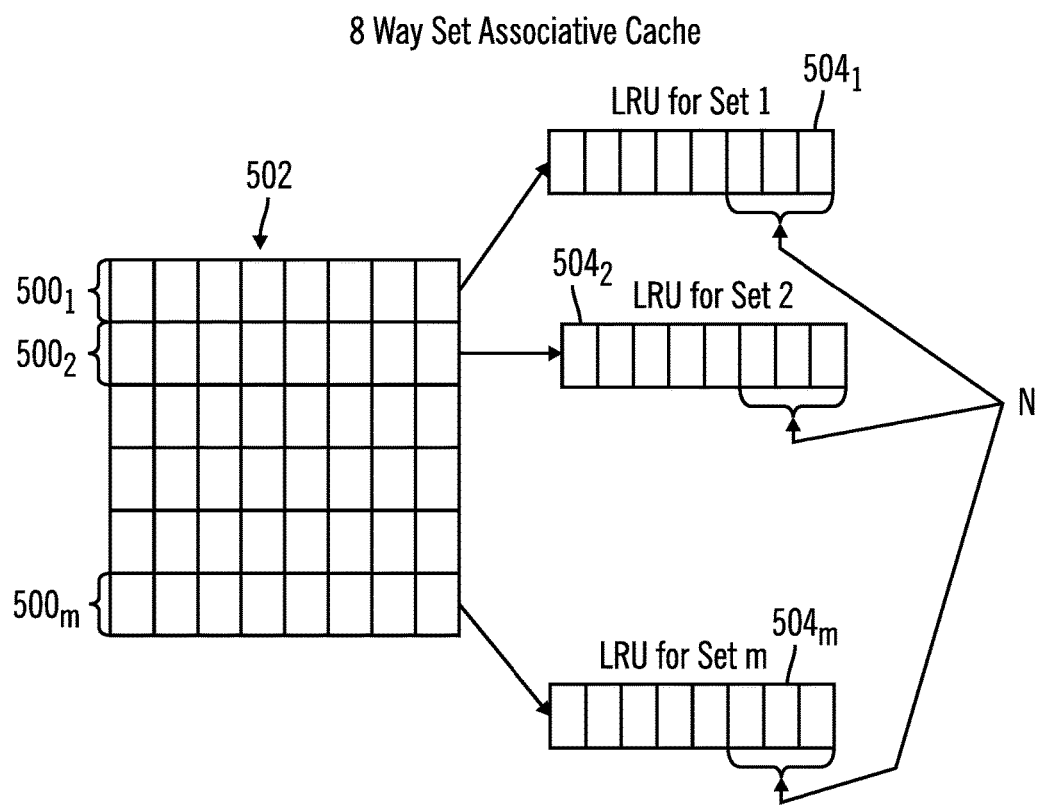
FIG. 5 illustrates an embodiment of a set associate cache.

FIG. 5 illustrates an 8 way set associate cache having sets $500_1$, $500_2$ ... $500_m$ of cache lines in a LLC 502, such as LLC 112, and the LRU lists $504_1$, $504_2$ ... $504_m$ for each set. Further, N of the least recently used entries are considered for candidates for eviction, which comprise a subset of all the entries in the LRU lists $504_1$, $504_2$ ... $504_m$.

With described embodiments, writes are minimized by performing a bitwise comparison to select one of candidate cache lines that has the fewest number of bits that differ from the bits in an incoming cache line from the second memory device. Further, by considering only a subset of the cache lines from the LRU end 304 of the LRU list $300_i$ for the set of addresses to which the address of the incoming cache line maps, the likelihood of a cache miss is reduced because cache lines at the least recently used end 304 of the LRU list $300_i$ for the set are less likely to be subject to a cache hit or read request than the cache lines closer to the MRU end 302. In this way, both the number of writes are minimized while not adversely affecting the cache hit and access ratio.

In alternative embodiments, the first and second memory devices described with respect to FIG. 4 may comprise memory devices deployed in environments different than the hierarchical cache system described with respect to FIG. 1. The second memory device may comprise a different type of storage or memory than a main memory 116, and the first memory device may comprise a different type of memory device than an intermediate memory between the main memory 116 and L2 cache.

Figure 6:
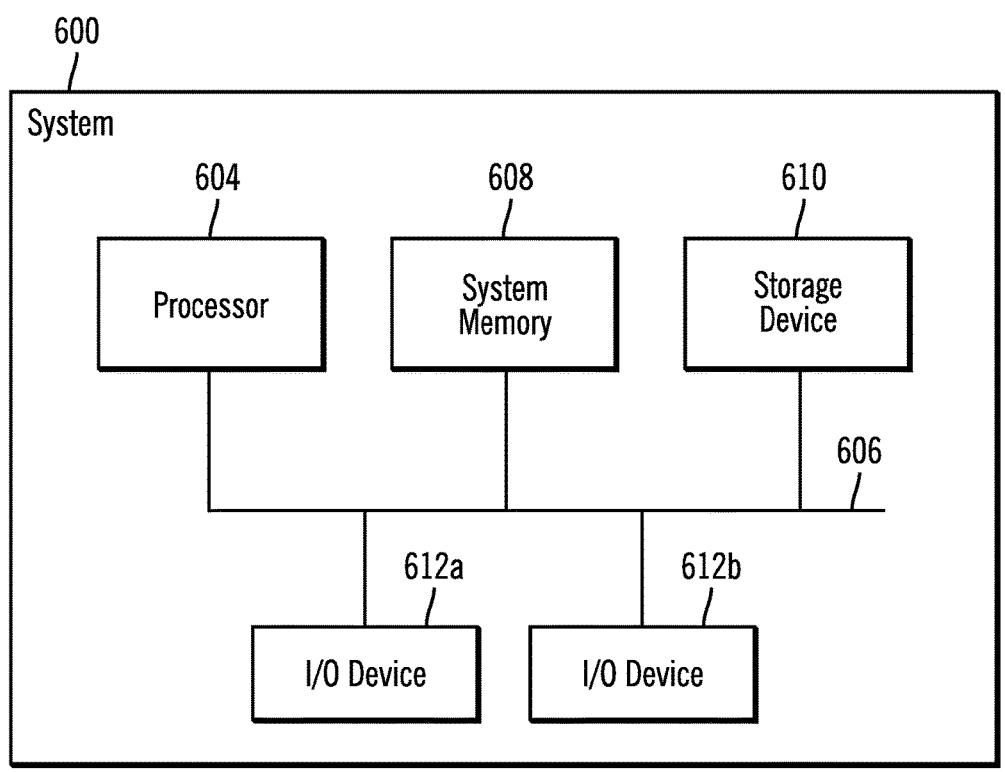
FIG. 6 illustrates a system in which the components of FIG. 1 may be deployed.

FIG. 6 illustrates an embodiment of a system 600 in which the system on a chip 102 of FIG. 1 may be deployed as the processor 604 and the main memory 116 may comprise the system memory 608. The system 600 may further include a storage device 610 for long-term storage. The processor 604 may communicate over a bus 606 with the system memory 608, in which programs, operands and parameters being executed are cached, and the non-volatile storage device 610. The processor 604 may also communicate with Input/Output (I/O) devices 612a, 612b, which may comprise input devices, display devices, graphics cards, ports, network interfaces, etc.

It should be appreciated that reference throughout this specification to "one structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

EXAMPLES

Example 1 is an apparatus to determine a cache line in a first memory device to evict for an incoming cache line from a second memory device, comprising: a memory management unit to: read an incoming cache line from the second memory device; process a plurality of cache lines in the first memory device to determine an eviction cache line of the plurality of cache lines in the first memory device having a least number of bits that differ from corresponding bits in the incoming cache line; and write bits from the incoming cache line that are different from the bits in the eviction cache line to the eviction cache line in the first memory device.

In Example 2, the subject matter of claims 1 and 3-10 can optionally include that to write the bits that are different is to perform a partial write operation to only write the corresponding bits in the incoming cache line that differ from the bits in the eviction cache line in the first memory device.

In Example 3, the subject matter of claims 1, 2 and 4-10 can optionally include that to determine the eviction cache line comprises: for each cache line of the plurality of cache lines in the first memory device, determine a number of corresponding bits in the cache line and the incoming cache line that differ, wherein the eviction cache line has the least number of bits that differ from the corresponding bits in the incoming cache line for the plurality of cache lines.

In Example 4, the subject matter of claims 1-3 and 5-10 can optionally include that to determine the number of corresponding bits that differ between each of the plurality of cache lines in the first memory device and the incoming cache line is to perform an XOR operation of bits in each of the plurality of cache lines in the first memory device and the incoming cache line.

In Example 5, the subject matter of claims 1-4 and 6-10 can optionally include that the first memory device is organized as a set-associative cache, wherein the memory management unit is to: determine a set of cache lines in the first memory device to which the incoming cache line maps according to a set associative address mapping function that determines a set of cache lines in the first memory device for an address of the incoming cache line, wherein the processed plurality of cache lines are in the set of cache lines, and wherein a number of addresses in the second memory device that map to a set of cache lines in the first memory device exceeds a number of the cache lines in the set of cache lines.

In Example 6, the subject matter of claims 1-5 and 7-10 can optionally include that the memory management unit is further to: determine a subset of least recently used cache lines in the determined set of cache lines to which the address of the incoming cache line maps, wherein the processed plurality of cache lines comprises the subset of least recently used cache lines, wherein the subset of least recently used cache lines comprises less than all the cache lines in the determined set.

In Example 7, the subject matter of claims 1-6 and 8-10 can optionally include that to determine the eviction cache line having the least number of bits that differ from corresponding bits in the incoming cache line performs a bitwise comparison of each of the cache lines in the subset of least recently used cache lines with the incoming cache line to determine one of the subset of least recently used cache lines in the subset having a fewest number of different bits from the incoming cache line.

In Example 8, the subject matter of claims 1-7, 9, and 10 can optionally include that the memory management unit is further to: maintain a least recently used list for each set of a plurality sets of cache lines in the first memory device ordering the cache lines in the set by least recently used, wherein the subset of least recently used cache lines is determined from the least recently used list for the determined set of cache lines to which the address of the incoming cache line maps.

In Example 9, the subject matter of claims 1-8 and 10 can optionally include that the apparatus comprises a processing unit including at least one processing core, wherein each of the at least one processing core includes a first level cache, wherein the first memory device comprises a last level cache to the at least one processing core in the processing unit, and wherein the second memory device comprises a main memory for the at least one processing core.

In Example 10, the subject matter of claims 1-9 can optionally include that the first memory device is implemented in a spin-transfer torque magnetic random-access memory (STT-RAM).

Example 11 is a system, comprising: a first memory device; a second memory device; a memory management unit to: read an incoming cache line from the second memory device; process a plurality of cache lines in the first memory device to determine an eviction cache line of the plurality of cache lines in the first memory device having a least number of bits that differ from corresponding bits in the incoming cache line; and write bits from the incoming cache line that are different from the bits in the eviction cache line to the eviction cache line in the first memory device.

In Example 12, the subject matter of claims 11 and 13-18 can optionally include that to write the bits that are different is to perform a partial write operation to only write the corresponding bits in the incoming cache line that differ from the bits in the eviction cache line in the first memory device.

In Example 13, the subject matter of claims 11, 12 and 14-18 can optionally include that to determine the eviction cache line comprises: for each cache line of the plurality of cache lines in the first memory device, determine a number of corresponding bits in the cache line and the incoming cache line that differ, wherein the eviction cache line has the least number of bits that differ from the corresponding bits in the incoming cache line for the plurality of cache lines.

In Example 14, the subject matter of claims 11-13 and 15-18 can optionally include that to determine the number of corresponding bits that differ between each of the plurality of cache lines in the first memory device and the incoming cache line is to perform an XOR operation of bits in each of the plurality of cache lines in the first memory device and the incoming cache line.

In Example 15, the subject matter of claims 11-14 and 16-18 can optionally include that the first memory device is organized as a set-associative cache, wherein the memory management unit is to: determine a set of cache lines in the first memory device to which the incoming cache line maps according to a set associative address mapping function that determines a set of cache lines in the first memory device for an address of the incoming cache line, wherein the processed plurality of cache lines are in the set of cache lines, and wherein a number of addresses in the second memory device that map to a set of cache lines in the first memory device exceeds a number of the cache lines in the set of cache lines.

In Example 16, the subject matter of claims 11-15 and 17-18 can optionally include that the memory management unit is further to: determine a subset of least recently used cache lines in the determined set of cache lines to which the address of the incoming cache line maps, wherein the processed plurality of cache lines comprises the subset of least recently used cache lines, wherein the subset of least recently used cache lines comprises less than all the cache lines in the determined set.

In Example 17, the subject matter of claims 11-16 and 18 can optionally include that to determine the eviction cache line having the least number of bits that differ from corresponding bits in the incoming cache line performs a bitwise comparison of each of the cache lines in the subset of least recently used cache lines with the incoming cache line to determine one of the subset of least recently used cache lines in the subset having a fewest number of different bits from the incoming cache line.

In Example 18, the subject matter of claims 11-17 can optionally include that the memory management unit is further to: maintain a least recently used list for each set of a plurality sets of cache lines in the first memory device ordering the cache lines in the set by least recently used, wherein the subset of least recently used cache lines is determined from the least recently used list for the determined set of cache lines to which the address of the incoming cache line maps.

Example 19 is a method for determining a cache line to evict from a first memory device for an incoming cache line from a second memory device, comprising: reading an incoming cache line from the second memory device; processing a plurality of cache lines in the first memory device to determine an eviction cache line of the plurality of cache lines in the first memory device having a least number of bits that differ from corresponding bits in the incoming cache line; and writing bits from the incoming cache line that are different from the bits in the eviction cache line to the eviction cache line in the first memory device.

In Example 20, the subject matter of claims 19 and 21-25 can optionally include that the writing the bits that are different comprises performing a partial write operation to only write the corresponding bits in the incoming cache line that differ from the bits in the eviction cache line in the first memory device.

In Example 21, the subject matter of claims 19, 20 and 22-25 can optionally include that the determining the eviction cache line comprises: for each cache line of the plurality of cache lines in the first memory device, determining a number of corresponding bits in the cache line and the incoming cache line that differ, wherein the eviction cache line has the least number of bits that differ from the corresponding bits in the incoming cache line for the plurality of cache lines.

In Example 22, the subject matter of claims 19-21 and 23-25 can optionally include that the determining the number of corresponding bits that differ between each of the plurality of cache lines in the first memory device and the incoming cache line comprises performing an XOR operation of bits in each of the plurality of cache lines in the first memory device and the incoming cache line.

In Example 23, the subject matter of claims 19-22 and 24-25 can optionally include that the first memory device is organized as a set-associative cache, further comprising: determining a set of cache lines in the first memory device to which the incoming cache line maps according to a set associative address mapping function that determines a set of cache lines in the first memory device for an address of the incoming cache line, wherein the processed plurality of cache lines are in the set of cache lines, and wherein a number of addresses in the second memory device that map to a set of cache lines in the first memory device exceeds a number of the cache lines in the set of cache lines.

In Example 24, the subject matter of claims 19-23 and 25 can optionally include determining a subset of least recently used cache lines in the determined set of cache lines to which the address of the incoming cache line maps, wherein the processed plurality of cache lines comprises the subset of least recently used cache lines, wherein the subset of least recently used cache lines comprises less than all the cache lines in the determined set.

In Example 25, the subject matter of claims 19-24 can optionally include that the determining the eviction cache line having the least number of bits that differ from corresponding bits in the incoming cache line performs a bitwise comparison of each of the cache lines in the subset of least recently used cache lines with the incoming cache line to determine one of the subset of least recently used cache lines in the subset having a fewest number of different bits from the incoming cache line.

Example 26 is an apparatus for determining a cache line to evict from a first memory device for an incoming cache line from a second memory device, comprising: means for reading an incoming cache line from the second memory device; means for processing a plurality of cache lines in the first memory device to determine an eviction cache line of the plurality of cache lines in the first memory device having a least number of bits that differ from corresponding bits in the incoming cache line; and means for writing bits from the incoming cache line that are different from the bits in the eviction cache line to the eviction cache line in the first memory device.

Example 27 is a machine-readable storage including machine-readable instructions, when executed, to implement a method or realize an apparatus as claimed in any preceding claim.

Example 28 is an apparatus comprising means to perform a method as claimed in any preceding claim.

What is claimed:

1. An apparatus to determine a cache line in a first memory device to evict for an incoming cache line from a second memory device, comprising:
a memory management unit to:
read an incoming cache line from the second memory device;
process a plurality of cache lines in the first memory device to determine an eviction cache line of the plurality of cache lines in the first memory device having a least number of bits that differ from corresponding bits in the incoming cache line; and
write bits from the incoming cache line that are different from the bits in the eviction cache line to the eviction cache line in the first memory device.

2. The apparatus of claim 1, wherein to write the bits that are different is to perform a partial write operation to only write the corresponding bits in the incoming cache line that differ from the bits in the eviction cache line in the first memory device.

3. The apparatus of claim 1, wherein to determine the eviction cache line comprises:
for each cache line of the plurality of cache lines in the first memory device, determine a number of corresponding bits in the cache line and the incoming cache line that differ, wherein the eviction cache line has the least number of bits that differ from the corresponding bits in the incoming cache line for the plurality of cache lines.

4. The apparatus of claim 3, wherein to determine the number of corresponding bits that differ between each of the plurality of cache lines in the first memory device and the incoming cache line is to perform an XOR operation of bits in each of the plurality of cache lines in the first memory device and the incoming cache line.

5. The apparatus of claim 1, wherein the first memory device is organized as a set-associative cache, wherein the memory management unit is to:
determine a set of cache lines in the first memory device to which the incoming cache line maps according to a set associative address mapping function that determines a set of cache lines in the first memory device for an address of the incoming cache line, wherein the processed plurality of cache lines are in the set of cache lines, and wherein a number of addresses in the second memory device that map to a set of cache lines in the first memory device exceeds a number of the cache lines in the set of cache lines.

6. The apparatus of claim 5, wherein the memory management unit is further to:
determine a subset of least recently used cache lines in the determined set of cache lines to which the address of the incoming cache line maps, wherein the processed plurality of cache lines comprises the subset of least recently used cache lines, wherein the subset of least recently used cache lines comprises less than all the cache lines in the determined set.

7. The apparatus of claim 6, wherein to determine the eviction cache line having the least number of bits that differ from corresponding bits in the incoming cache line performs a bitwise comparison of each of the cache lines in the subset of least recently used cache lines with the incoming cache line to determine one of the subset of least recently used cache lines in the subset having a fewest number of different bits from the incoming cache line.

8. The apparatus of claim 6, wherein the memory management unit is further to:
maintain a least recently used list for each set of a plurality sets of cache lines in the first memory device ordering the cache lines in the set by least recently used, wherein the subset of least recently used cache lines is determined from the least recently used list for the determined set of cache lines to which the address of the incoming cache line maps.

9. The apparatus of claim 6, wherein the apparatus comprises a processing unit including at least one processing core, wherein each of the at least one processing core includes a first level cache, wherein the first memory device comprises a last level cache to the at least one processing core in the processing unit, and wherein the second memory device comprises a main memory for the at least one processing core.

10. The apparatus of claim 1, wherein the first memory device is implemented in a spin-transfer torque magnetic random-access memory (STT-RAM).

11. A system, comprising:
a first memory device;
a second memory device;
a memory management unit to:
read an incoming cache line from the second memory device;
process a plurality of cache lines in the first memory device to determine an eviction cache line of the plurality of cache lines in the first memory device having a least number of bits that differ from corresponding bits in the incoming cache line; and
write bits from the incoming cache line that are different from the bits in the eviction cache line to the eviction cache line in the first memory device.

12. The system of claim 11, wherein to write the bits that are different is to perform a partial write operation to only write the corresponding bits in the incoming cache line that differ from the bits in the eviction cache line in the first memory device.

13. The system of claim 11, wherein to determine the eviction cache line comprises:
for each cache line of the plurality of cache lines in the first memory device, determine a number of corresponding bits in the cache line and the incoming cache line that differ, wherein the eviction cache line has the least number of bits that differ from the corresponding bits in the incoming cache line for the plurality of cache lines.

14. The system of claim 13, wherein to determine the number of corresponding bits that differ between each of the plurality of cache lines in the first memory device and the incoming cache line is to perform an XOR operation of bits in each of the plurality of cache lines in the first memory device and the incoming cache line.

15. The system of claim 11, wherein the first memory device is organized as a set-associative cache, wherein the memory management unit is to:
determine a set of cache lines in the first memory device to which the incoming cache line maps according to a set associative address mapping function that determines a set of cache lines in the first memory device for an address of the incoming cache line, wherein the processed plurality of cache lines are in the set of cache lines, and wherein a number of addresses in the second memory device that map to a set of cache lines in the first memory device exceeds a number of the cache lines in the set of cache lines.

16. The system of claim 15, wherein the memory management unit is further to:
determine a subset of least recently used cache lines in the determined set of cache lines to which the address of the incoming cache line maps, wherein the processed plurality of cache lines comprises the subset of least recently used cache lines, wherein the subset of least recently used cache lines comprises less than all the cache lines in the determined set.

17. The system of claim 16, wherein to determine the eviction cache line having the least number of bits that differ from corresponding bits in the incoming cache line performs a bitwise comparison of each of the cache lines in the subset of least recently used cache lines with the incoming cache line to determine one of the subset of least recently used cache lines in the subset having a fewest number of different bits from the incoming cache line.

18. The system of claim 16, wherein the memory management unit is further to:
maintain a least recently used list for each set of a plurality sets of cache lines in the first memory device ordering the cache lines in the set by least recently used, wherein the subset of least recently used cache lines is determined from the least recently used list for the determined set of cache lines to which the address of the incoming cache line maps.

19. A method for determining a cache line to evict from a first memory device for an incoming cache line from a second memory device, comprising:
reading an incoming cache line from the second memory device;
processing a plurality of cache lines in the first memory device to determine an eviction cache line of the plurality of cache lines in the first memory device having a least number of bits that differ from corresponding bits in the incoming cache line; and
writing bits from the incoming cache line that are different from the bits in the eviction cache line to the eviction cache line in the first memory device.

20. The method of claim 19, wherein the writing the bits that are different comprises performing a partial write operation to only write the corresponding bits in the incoming cache line that differ from the bits in the eviction cache line in the first memory device.

21. The method of claim 19, wherein the determining the eviction cache line comprises:
for each cache line of the plurality of cache lines in the first memory device, determining a number of corresponding bits in the cache line and the incoming cache line that differ, wherein the eviction cache line has the least number of bits that differ from the corresponding bits in the incoming cache line for the plurality of cache lines.

22. The method of claim 21, wherein the determining the number of corresponding bits that differ between each of the plurality of cache lines in the first memory device and the incoming cache line comprises performing an XOR operation of bits in each of the plurality of cache lines in the first memory device and the incoming cache line.

23. The method of claim 19, wherein the first memory device is organized as a set-associative cache, further comprising:
determining a set of cache lines in the first memory device to which the incoming cache line maps according to a set associative address mapping function that determines a set of cache lines in the first memory device for an address of the incoming cache line, wherein the processed plurality of cache lines are in the set of cache lines, and wherein a number of addresses in the second memory device that map to a set of cache lines in the first memory device exceeds a number of the cache lines in the set of cache lines.

24. The method of claim 23, further comprising:
determining a subset of least recently used cache lines in the determined set of cache lines to which the address of the incoming cache line maps, wherein the processed plurality of cache lines comprises the subset of least recently used cache lines, wherein the subset of least recently used cache lines comprises less than all the cache lines in the determined set.

25. The method of claim 24, wherein the determining the eviction cache line having the least number of bits that differ from corresponding bits in the incoming cache line performs a bitwise comparison of each of the cache lines in the subset of least recently used cache lines with the incoming cache line to determine one of the subset of least recently used cache lines in the subset having a fewest number of different bits from the incoming cache line.

* * * * *